United States Patent
Land et al.

(10) Patent No.: US 9,778,727 B2
(45) Date of Patent: Oct. 3, 2017

(54) AMBIENT LIGHT SENSORS WITH AUTO GAIN SWITCHING CAPABILITIES

(71) Applicant: Apple Inc., Cupertino, CA (US)

(72) Inventors: Brian R. Land, Woodside, CA (US); Dong Zheng, Los Altos, CA (US); Venkata Siva Sunil Kumar Reddy Bommu, San Jose, CA (US)

(73) Assignee: Apple Inc., Cupertino, CA (US)

(*) Notice: Subject to any disclaimer, the term of this patent is extended or adjusted under 35 U.S.C. 154(b) by 4 days.

(21) Appl. No.: 14/849,147

(22) Filed: Sep. 9, 2015

(65) Prior Publication Data

US 2017/0068303 A1  Mar. 9, 2017

(51) Int. Cl.
| | |
|---|---|
| *G06F 1/32* | (2006.01) |
| *G01J 1/42* | (2006.01) |
| *G01J 1/44* | (2006.01) |
| *G09G 5/00* | (2006.01) |
| *G09G 5/10* | (2006.01) |

(52) U.S. Cl.
CPC .......... *G06F 1/3265* (2013.01); *G01J 1/4204* (2013.01); *G01J 1/44* (2013.01); *G06F 1/3287* (2013.01); *G09G 5/006* (2013.01); *G09G 5/10* (2013.01); *G09G 2320/0626* (2013.01); *G09G 2330/021* (2013.01); *G09G 2360/144* (2013.01)

(58) Field of Classification Search
CPC ....... G06F 1/3265; G06F 1/3287; G09G 5/10; G09G 5/006; G09G 2330/023; G09G 2360/144; G09G 2320/0626; G01J 1/44; G01J 1/4204
See application file for complete search history.

(56) References Cited

U.S. PATENT DOCUMENTS

| | | | |
|---|---|---|---|
| 7,550,703 B2 | 6/2009 | Bechtel et al. | |
| 7,573,210 B2 | 8/2009 | Ashdown et al. | |
| 8,258,453 B2 | 9/2012 | Rees | |
| 2008/0054159 A1* | 3/2008 | Yu | G01J 1/32 250/205 |
| 2008/0157682 A1* | 7/2008 | Kwon | G09G 3/3406 315/154 |
| 2011/0186714 A1* | 8/2011 | Hung | G01J 1/44 250/214 AL |
| 2012/0050189 A1* | 3/2012 | Choboter | H04M 1/72577 345/173 |

(Continued)

*Primary Examiner* — Aneeta Yodichkas
(74) *Attorney, Agent, or Firm* — Treyz Law Group, P.C.; Jason Tsai; Zachary D. Hadd (57) ABSTRACT

An ambient light sensor that is operable in high gain mode and low gain mode is provided. The high gain mode may help provide satisfactory sensitivity at low light levels but may generate saturated output levels in bright ambient lighting conditions. Low gain mode may therefore be switched into use when bright ambient lighting conditions are detected. The ambient light sensor may be placed in high gain mode by default. An auto-gain switch controller may detect whether the ambient light reading is saturated during as given period of time. In response to determining that the ambient light reading is saturated for a programmable number of consecutive time periods, the auto-gain switch controller may reset and switch the ambient light sensor to the low gain mode. The gain state may optionally be embedded into the ambient light sensor output.

22 Claims, 7 Drawing Sheets

(56) References Cited

U.S. PATENT DOCUMENTS

2013/0328842 A1* 12/2013 Barnhoefer .......... G09G 3/3406
345/207
2014/0252211 A1 9/2014 Chua et al.
2014/0333928 A1* 11/2014 Erdtmann ............ G08B 17/107
356/338

* cited by examiner

AMBIENT LIGHT SENSORS WITH AUTO GAIN SWITCHING CAPABILITIES

BACKGROUND

This relates generally to electronic devices, and more particularly, to light sensors for electronic devices.

Electronic devices such as laptop computers, cellular telephones, and other equipment are sometimes provided with light sensors. For example, ambient light sensors may be incorporated into a device to provide the device with information on current lighting conditions. Ambient light readings may be used in controlling the device. If, for example bright daylight conditions are detected, an electronic device may increase display brightness to compensate.

In conventional electronic device displays, the display brightness may still be too dim when being operated in bright daylight conditions (i.e., the maximum display brightness setting may not be capable of outputting a sufficient luminance level to properly display content to the user in sunny outdoor conditions). Allowing the display brightness to always toggle to an even higher brightness setting whenever bright ambient light conditions are detected may, however, consume an excessive amount of power.

It would therefore be desirable to be able to provide improved sensors for electronic device such as improved ambient light sensors.

SUMMARY

An electronic device nay be provided with a display mounted in a housing. In accordance with an embodiment, the electronic device may include control circuitry in the housing and an ambient light sensor in the housing with which the control circuitry measures an ambient light intensity, where the ambient light sensor is operable in a plurality of gain states and is configured to filter out high intensity pulses. The control circuitry may include an auto gain switching (AGS) control logic that places the ambient light sensor in one of the plurality of gain states.

The auto gain switching control logic may include a saturation detection module that detects when the ambient light sensor exhibits a saturated sensor output. The auto gain switching control logic may also include a persistency checking module that determines whether the ambient light sensor exhibits a saturated sensor output in a consecutive number of persistency checking intervals. The number of persistency checking interval that is checked by the persistency checking module may be dynamically programmable.

The ambient light sensor may be configured, in an auto gain switching enabled mode and an auto gain switching disabled mode. In the AGS disabled mode, the control circuitry manually sets the ambient light sensor in a fixed gain state. In the AGS enabled mode, the ambient light sensor may be placed in the plurality of gain states and may exhibit a reduced analog-to-digital conversion (ADS) resolution relative to the AGS disabled mode.

In accordance with another suitable embodiment, a method for operating an electronic device that includes an ambient light sensor is provided. The method includes using the ambient light sensor to output an ambient light sensor reading to the control circuitry, using auto gain switching (AGS) control logic in the ambient light sensor to place the ambient light sensor in a plurality of gain states, and using the auto gain switching control logic to switch from one gain state to another gain state in the plurality of gain states while filtering out spurious noise sources. The control circuitry may be used to adjust the brightness of a display in the electronic device depending on the magnitude of the ambient light sensor reading.

The method may also include setting the ambient light sensor to a high gain state at the beginning of an integration period. The method also includes monitoring the ambient light sensor reading, for saturation during a persistency checking, period that is a subset of the integration period, and determining whether a persistency checking condition is satisfied by verifying whether the ambient light sensor reading has consistently saturated during the entirety of the persistency checking period. In response to determining that the persistency checking is not satisfied, the ambient light sensor may continue operating in the high gain state. In response to determining that the persistency checking condition is satisfied, the ambient light sensor may be adjusted to a low gain state. When the ambient light sensor is in the low gain state, the ambient light sensor may be reset back to the high gain state at the end of the integration period.

The accordance with some embodiments, the system may allow dynamic adjustment of the duration of the persistency checking period to set the strength of the filtering operation. If desired, the gain state of the ambient light sensor may also be embedded in the ambient light sensor reading.

Further features of the invention, its nature and various advantages will be more apparent from the accompanying drawings and following detailed description.

DETAILED DESCRIPTION

Figure 1:
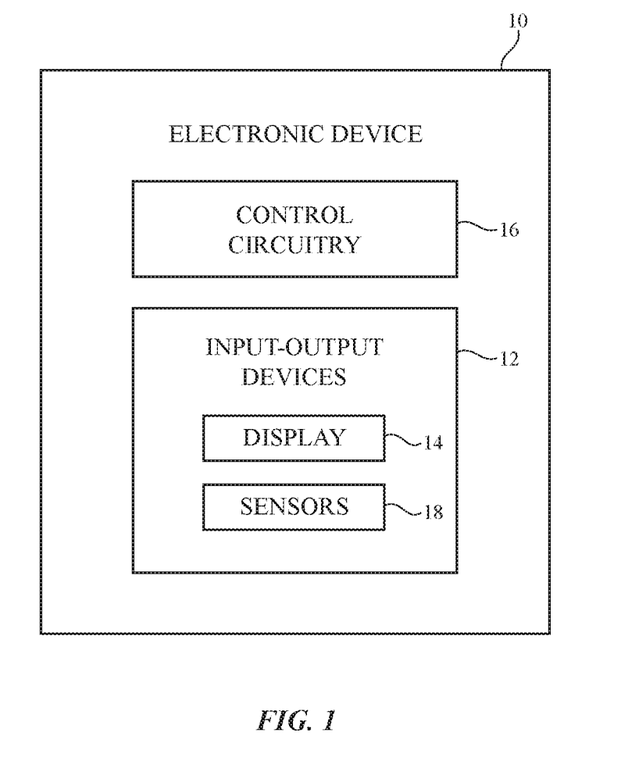
FIG. 1 is a schematic diagram of an illustrative electronic device having a light sensor in accordance with an embodiment.

An illustrative electronic device of the type that may be provided with one or more light sensors is shown in FIG. 1. Electronic device 10 may be a computing device such as a laptop computer, a computer monitor containing an embedded computer, a tablet computer, a cellular telephone, a media player, or other handheld or portable electronic, device, a smaller device such as a wrist-watch device, a pendant device, a headphone or earpiece device, a device embedded in eyeglasses or other equipment worn on a user's head, or other wearable or miniature device, a television, a computer display that does not contain an embedded computer, a gaming device, a navigation device, an embedded system such as a system in which electronic equipment with a display is mounted in a kiosk or automobile, equipment that implements the functionality of two or more of these devices, or other electronic equipment.

As shown in FIG. 1, electronic device 10 may have control circuitry 16. Control circuitry 16 may include storage and processing circuitry for supporting the operation of device 10. The storage and processing circuitry may include storage such as hard disk drive storage, nonvolatile memory (e.g., flash memory or other electrically-programmable-read-only memory configured to form a solid state drive), volatile memory (e.g., static or dynamic random-access-memory), etc. Processing circuitry in control circuitry 16 may be used to control the operation of device 10. The processing circuitry may be based on one or more microprocessors, microcontrollers, digital signal processors, baseband processors, power management units, audio chips, application specific integrated circuits, etc.

Input-output circuitry in device 10 such as input-output devices 12 may be used to allow data to be supplied to device 10 and to allow data to be provided from device 10 to external devices. Input-output devices 12 may include buttons, joysticks, scrolling wheels, touch pads, key pads, keyboards, microphones, speakers, tone generators, vibrators, cameras, light-emitting diodes and other status indicators, data ports, etc. A user can control the operation of device 10 by supplying commands through input-output devices 12 and may receive status information and other output from device 10 using the output resources of input-output devices 12.

Input-output devices 12 may include one or more displays such as display 14. Display 14 may be a touch screen display that includes a touch sensor for gathering touch input from a user or display 14 may be insensitive to touch. A touch sensor for display 14 may be based on an array of capacitive touch sensor electrodes, acoustic touch sensor structures, resistive touch components, force-based touch sensor structures, a light-based touch sensor, or other suitable touch sensor arrangements.

Input-output devices 12 may also include sensors 18. Sensors 18 may include an ambient light sensor and other sensors (e.g., a capacitive proximity sensor, a light-based proximity sensor, a magnetic sensor, an accelerometer, a force sensor, a touch sensor, a temperature sensor, a pressure sensor, a compass, a microphone or other sound sensor, or other sensors). An ambient light sensor may be provided with auto gain switching (AGS) capabilities. In particular, the ambient light sensor may be operable in multiple different gain modes. For example, the ambient light sensor may be configured in a high gain mode in response to detecting dark ambient lighting conditions (e.g., to help increase sensitivity in low light conditions) and may be configured in a low gain mode in response to detecting bright ambient lighting conditions (e.g., to help avoid charge saturation in sunny outdoor conditions). Selectively configuring the ambient light sensor in different gain modes by monitoring the amount of ambient light can help extend the dynamic range of the ambient light sensor. If desired, information from other sensors (e.g., an orientation sensor, a camera, etc.) may be used in combination with information from the ambient light sensor (e.g., to determine how device 10 is oriented relative to the viewer, etc.).

Figure 2:
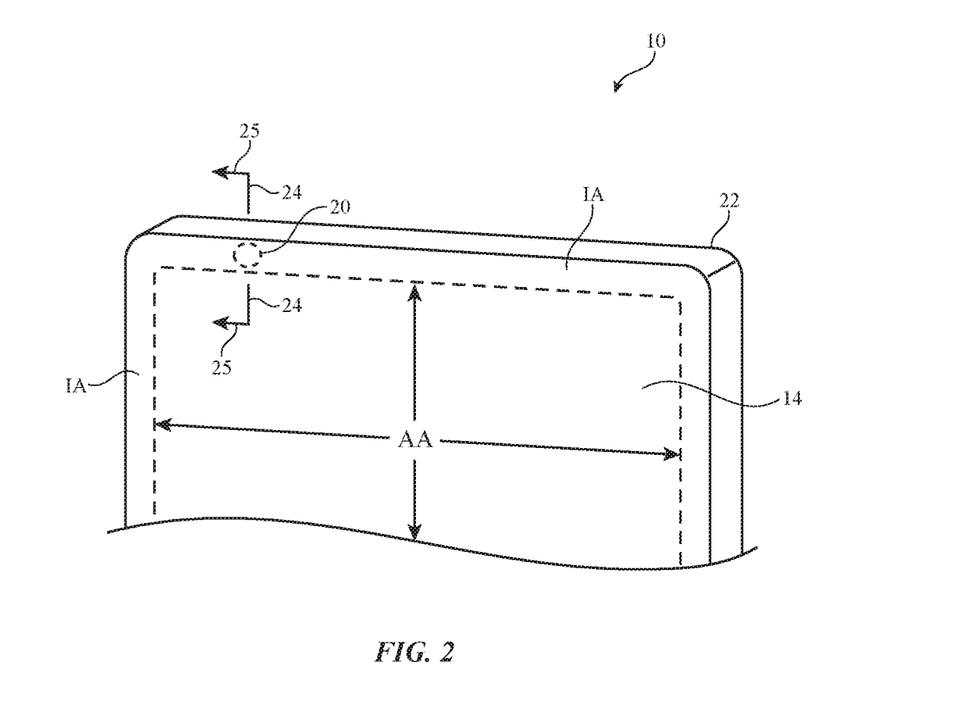
FIG. 2 is a perspective view of a portion of an electronic device display having an ambient light sensor in accordance with an embodiment.

A perspective view of a portion of an illustrative electronic device is shown in FIG. 2. In the example of FIG. 2, device 10 includes a display such as display 14 mounted in housing 22. Housing 22, which may sometimes be referred to as an enclosure or case, may be formed of plastic, glass, ceramics, fiber composites, metal (e.g., stainless steel, aluminum, etc.), other suitable materials, or a combination of any two or more of these materials. Housing 22 may be formed using a unibody configuration in which some or all of housing 22 is machined or molded as a single structure or may be formed using multiple structures (e.g., an internal frame structure, one or more structures that form exterior housing surfaces, etc.).

Display 14 may be protected using a display cover layer such as a layer of transparent glass, clear plastic, sapphire, or other clear layer. Openings may be formed in the display cover layer. For example, an opening may be formed in the display cover layer to accommodate a button, a speaker port, or other components. Openings may be formed in housing 22 to form communications ports (e.g., an audio jack port, a digital data port, etc.), to form openings for buttons, etc.

Display 14 may include an array of display pixels formed from liquid crystal display (LCD) components, an array of electrophoretic pixels, an array of plasma pixels, an array of organic light-emitting diode pixels or other light-emitting diodes, an array of electrowetting pixels, or pixels based on other display technologies. The array of pixels of display 14 forms an active area AA. Active area AA is used to display images for a user of device 10. Active area AA may be rectangular or may have other suitable shapes. Inactive border area IA may run along one or more edges of active area AA. Inactive border area IA may contain circuits, signal lines, and other structures that do not emit light for forming images. To hide inactive circuitry and other components in border area IA from view by a user of device 10, the underside of the outermost layer of display 14 (e.g., the display cover layer or other display layer) may be coated with an opaque masking material such as a layer of black ink.

Optical components (e.g., a camera, a light-based proximity sensor, an ambient light sensor, status indicator light-emitting diodes, camera flash light-emitting diodes, etc.) may be mounted under inactive border area IA. One or more openings (sometimes referred to as windows) may be formed in the opaque masking layer of the inactive border area IA to accommodate the optical components. For example, a light component window such as an ambient light sensor window may be formed in a peripheral portion of display 14 such as region 20 in inactive border area IA. Ambient light from the exterior of device 10 may be measured by an ambient light sensor in device 10 after passing through region 20 and the display cover layer.

Figure 3:
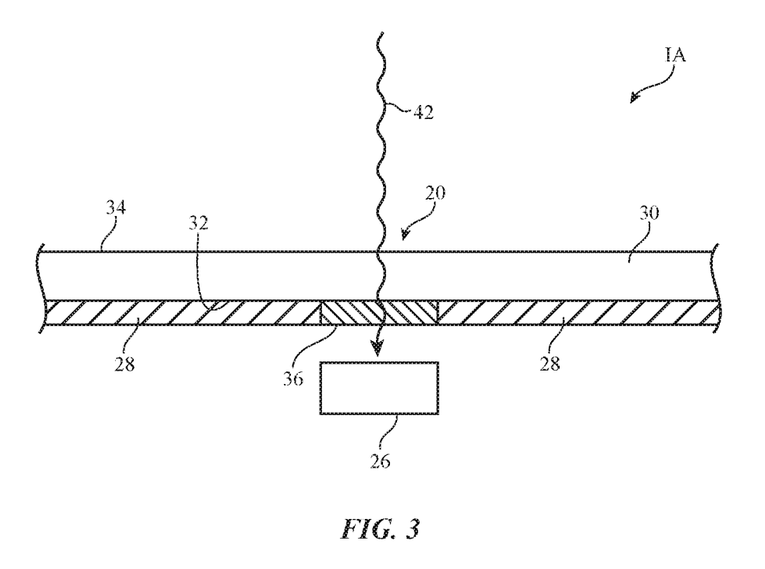
FIG. 3 is a cross-sectional side view of an illustrative light sensor that is being mounted in accordance with an embodiment.

FIG. 3 is a cross-sectional side view of display 14 of FIG. 2 taken along line 24 and viewed in direction 25 of FIG. 2. As shown in FIG. 3, light sensor 26 may be mounted in alignment with window 20. Light sensor 26 may be an ambient light sensor that is used in measuring ambient light from various light sources. Display cover layer 30 has an outer surface such as surface 34. Window 20 may be formed from an opening in opaque masking layer 28 on inner surface 32 of display cover layer 30 in inactive area IA. Layer 30 may be formed from glass, plastic, ceramic, sapphire, or other transparent materials and may be a part of display 14 or a separate protective layer that covers active display structures. The opening associated with window 20 may be filled with window material 36. Window material 36 may be material that is transparent to some or all of the visible light spectrum. For example, window material 36 may be filled from a clear or translucent polymer or other transparent material. Window material 36 may, if desired, include diffuser material and/or material that forms a Fresnel lens or other light directing features that help guide incoming light 42 to light sensor 26.

Conventional ambient light sensors with a single fixed gain setting have limited dynamic range. Consider a scenario in which a first ambient light sensor has a relatively high sensitivity to light. In low light conditions, the first ambient light sensor may function wonderfully to detect the amount of light that is present. In brighter light conditions however, the first ambient light sensor may be easily saturated and may therefore not be capable of providing any useful information. Consider another scenario in which a second ambient light sensor exhibits a relatively low sensitivity to light. In bright light conditions, the second ambient light sensor may function properly to detect the mount of light that is present without being constantly saturated. In low light conditions, however, the second ambient light sensor may not be sensitive enough to be able to capture any useful information.

It would therefore be desirable to provide improved light sensors that is operable in multiple different gain modes. In accordance with an embodiment, light sensors are provided that can be configured in a high gain mode (e.g., a mode that exhibits high sensitivity to light), a low gain mode (e.g., a mode that exhibits low sensitivity to light), and optionally one or more intermediate gain modes one or more modes that exhibit moderate sensitivity to light). For example, an ambient light sensor may be configured in a high gain mode in response to detecting that the device is being operated in low light conditions or may be configured in a low gain mode in response to detecting that the device is being operated in bright light conditions.

The high gain mode may exhibit a gain that is 10 times the gain of the low gain mode (as an example). As another example, the high gain mode may exhibit a gain that is 20 times the gain of the low gain mode. As yet another example, the high gain mode may exhibit a gain that is 40 times the gain of the low gain mode. These examples are merely illustrative. In general, the light sensor may have any number of programmable gain settings (e.g., at least two configurable gain settings, four or more configurable gain settings, eight or more configuration gain settings, etc.) that can adjust the relative strength of the high gain mode to the low gain mode. Operating light sensors using multiple programmable gain settings can help extend the dynamic range of the light sensors.

One common application of light sensors is adjusting the display brightness in response to the amount of ambient light that is currently being detected. For example, the display may be dimmed in low ambient light conditions so that the display is not unnecessary bright (which can also help reduce power consumption), whereas the display may be made brighter in bright ambient light conditions so that the display can be more easily viewed by the user. In sunny conditions, however, conventional displays may still not be bright enough to adequately display content to the user (i.e., the display is still too dim even when it is configured to output at its maximum luminance level).

In accordance with an embodiment, an electronic device display may be provided with an outdoor viewing mode that is capable of providing substantially higher luminance levels at the expense of display viewing angle. When the display is configured in this outdoor viewing mode, the display may be bright enough to adequately display content to the user even under sunny conditions. Since the outdoor viewing mode outputs substantially brighter images and therefore consumes more power, it would be desirable to ensure that the outdoor viewing mode is accurately enabled and not constantly being activated by false triggering events.

For example, consider a scenario in which a device is being operated at night in a relatively low light environment. The device may include an ambient light sensor that is appropriately configured in a high gain mode and may also include a display that is outputting content at its normal viewing mode (e.g., a viewing mode that has a brightness setting that is substantially lower than that of the outdoor viewing, mode).

In real world environments, it is common for the device to experience short duration high intensity pulses in low light conditions such as camera flash. If care is not taken, the ambient light sensor may detect these high intensity pulses and can inadvertently reconfigure itself to operate in the low gain mode and thereby trigger the display to operate in the outdoor viewing mode, both of which are not suitable for operation in low light environment. The selective switching of light sensor gain modes from high to low or vice versa (a mechanism that is sometimes referred to as "auto gain switching" or AGS) should therefore be able to filter out such short duration high intensity pulses so as to prevent the inadvertent switching of light sensor gain modes. In accordance with an embodiment of the present invention, this can be accomplished via a programmable filter, which can be realized by implementing a programmable persistency checking period before allowing the gain to switch.

Figure 4:
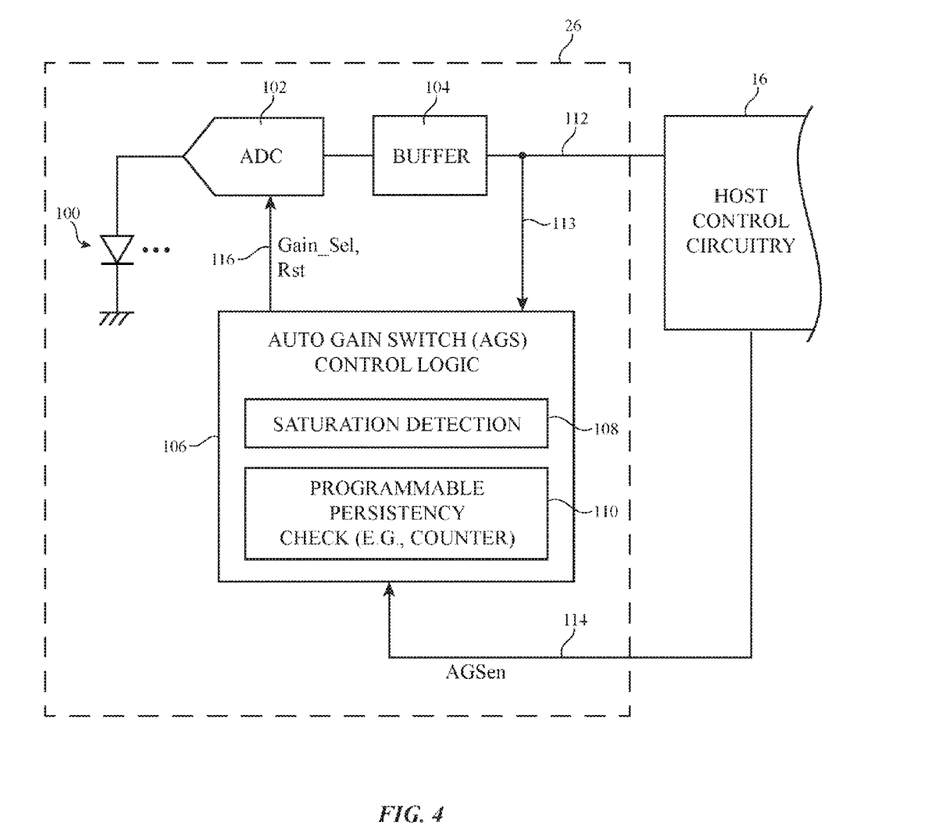
FIG. 4 is a diagram of an illustrative light sensor with auto gain switching capabilities in accordance with an embodiment.

FIG. 4 is a diagram of an illustrative light sensor with auto gain switching (AGS) capabilities, where the AGS is provided with a programmable persistency checking mechanism. As shown in FIG. 4, a light sensor 26 such as an ambient light sensor may include a light detector 100, a data converter 102, a buffer circuit 104, and associated AGS control logic 106. In general, ambient light sensor 26 may be formed from a semiconductor substrate such as a silicon substrate. One or more detectors 100 such as phototransistors, photodiodes, or other photodetectors that is capable of detecting incoming light may be formed on the semiconductor substrate.

Detector 100 may be coupled to an input of data converter 102. Data converter 102 may be an analog-to-digital converter (ADC) circuit that receives an amount of charge from the photosensitive detector 100 and generates a corresponding digital output that is proportional to the amount of charge that is received from detector 100. Analog-to-digital converter 102 may be a ramp A/D converter, successive approximation A/D converter, a flash A/D converter, a hybrid A/D converter employing a combination of these data converting architectures, and other suitable types of data converters. Data converter 102 may exhibit any suitable resolution (e.g., 10-bit ADC resolution, 12-bit ADC resolution, 15-bit ADC resolution, 16-bit ADC resolution, etc.).

Digital data output from A/D converter 102 may be temporarily stored in buffer circuit 104. Latching the ADC output using buffer 104 can allow the light detector 100 to being the next integration cycle without delay. The buffered output may be fed to external host control circuitry 16 (e.g., control circuitry 16 described in connection with FIG. 1) via path 112 and also internally to AGS control logic 106 via path 113. Depending on the data that is received from light sensor 26 over path 112, host control circuitry 16 may be configured to adjust the display brightness of the electronic device, to adjust the interference appearance of the device, or take other suitable action.

In particular host control circuitry 16 may also be capable of enabling or disabling the AGS functionality of light sensor 26 by selectively asserting AGS enable signal AGSen that is provided to AGS control logic 106 via path 114. When signal AGSen is asserted (e.g., when AGSen is logic "1"), light sensor 26 may be operable in multiple gain modes to enable extended dynamic range. When signal AGSen is deasserted (e.g., when AGSen is logic "0"), light sensor 26 may be operated in a fixed gain mode that is manually set by the host control circuitry 16. For example, host control circuitry 16 may manually configure light sensor 26 in a nominal low gain mode when the AGS functionality is disabled. As another example, control circuitry 16 may manually configure light sensor 26 in a high gain mode that exhibits a gain that is equal to a predetermined integer multiple of the nominal low gain mode when the AGS functionality is deactivated. Each of interconnect paths 112 and 114 may be implemented using an I2C serial bus, a serial peripheral interface (SPI), a universal serial bus (USB), a PCIe bus, a serial AT attachment (SATA) bus, or other types of peripheral bus for communicating with control circuitry 16.

As shown in FIG. 4, auto gain switch control logic 106 may be provided with a saturation detection mechanism 108 and a programmable persistency checking mechanism 110. Configured in this way, AGS control logic 106 may be able to detect whether the ADC output provided over path 113 has been saturated. Detection of a saturation event may indicate that the current sensitivity of the light sensor is too high (i.e., that the gain mode ought to be switched to a lower gain mode). In accordance with an embodiment, the saturation detection may be operated in conjunction with programmable persistency checking mechanism 110 to help minimize inadvertent switching of gain modes (e.g., to help filter out high intensity light pulses that ought to be ignored).

The persistency checking may involve verifying that the ADC output has saturated consistently over an extended period of time. As an example, the persistency checking criteria may require that the ADC output saturates for four consecutive cycles. If the ADC output saturates for only three cycles and then becomes unsaturated during, the persistency checking period, the persistency checking criteria will not be met. If, however, the ADC output saturates for at least four consecutive cycles during the persistency checking period, the persistency checking criteria is satisfied, and the AGS control logic 106 may be allowed to toggle the gain state of light sensor 26. In the arrangement of FIG. 4, AGS control logic 106 may provide gain control signals Gain_Sel, reset signals Rst, and/or other control/initialization signals to data converter 102 via path 116. For example, the AGS control logic 106 may configured A/D converter 102 in a low gain mode by setting signals Gain_Sel to "00," in a high gain mode by setting signals Gain_Sel to "11," or in some intermediate gain mode by setting Gain_Sel to "01" or "10."

The requirement of four consecutive saturation detection events is merely exemplary and does not serve to limit the scope of the present invention. In general, the number of consecutive saturation detection events that is required by the persistency checking mechanism may be programmable to provide additional flexibility in filtering out different types of noise (e.g., the persistency checking criteria may require less than four consecutive saturation events to be detected or more than four consecutive saturation events to be detected). Operating the AGS control logic 106 in this way can help filter out spurious high intensity light pulses in low light environments.

Figure 5:
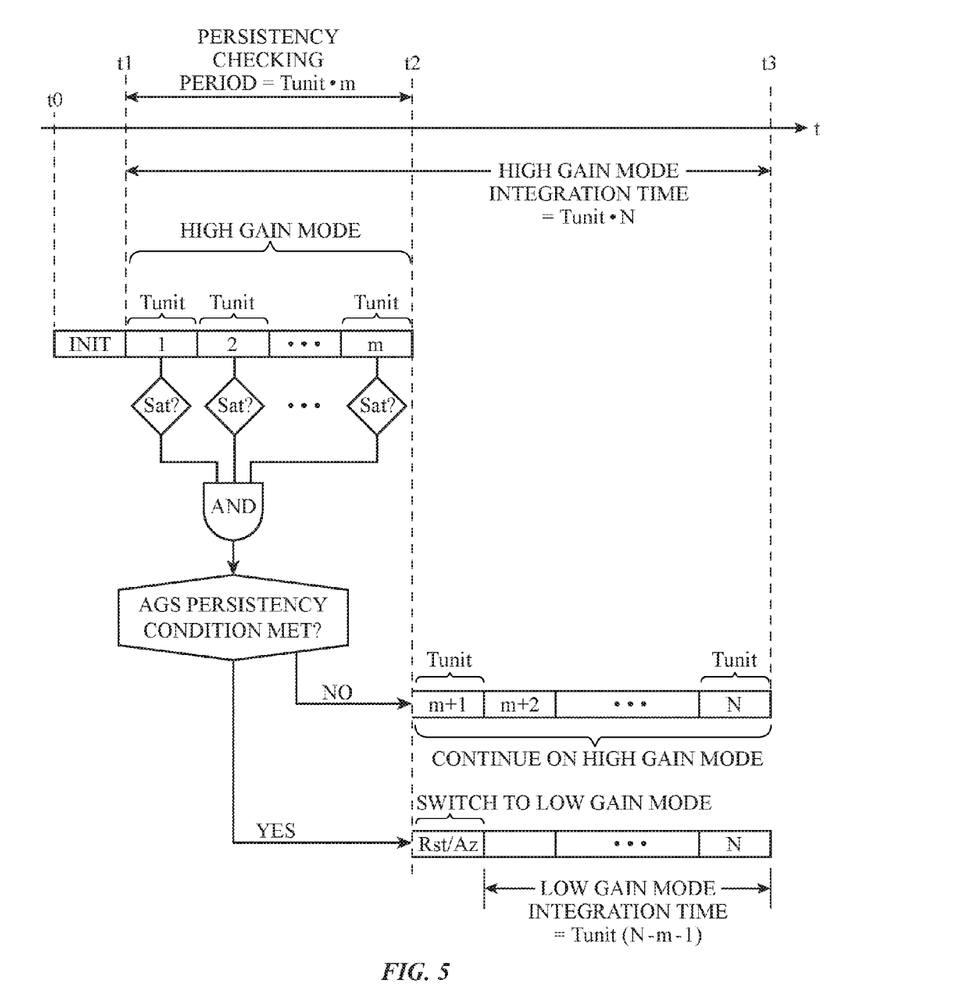
FIG. 5 is a timing diagram that illustrates the operation of a light sensor of the type shown in FIG. 4 in accordance with an embodiment.

FIG. 5 is a timing diagram that illustrates the operation of light sensor 26 of the type described in connection with FIG. 4. The time period from t0-t3 may represent one integration cycle. From time t0-t1, light sensor 26 may be initialized (e.g., A/D converter 102 may be reset and auto-zeroed, photodetector 100 may also be reset, etc.). In accordance with an embodiment, the light sensor may be initialized to high gain mode by default. Initializing the light sensor to high gain mode may be advantageous since it is easier to be saturated when the sensitivity is high. If however, the sensitivity is set to a low value by default, the light sensor will not know to switch back to high gain mode even if it is being operated in low ambient light conditions.

The time period from t1-t2 may represent the persistency checking period. The light sensor may be operated in high gain mode during the entirety of the persistency checking period. The persistency checking period may include m unit checking intervals or cycles) Tunit. Each interval Tunit may be 5 milliseconds (ms) in duration (as an example). As described above, the number of intervals Tunit that is checked during the persistency checking period may be programmable (e.g., m may be adjusted).

During each Tunit, saturation detection module 108 (FIG. 4) may determine whether the ADC output is saturated. In one suitable arrangement, programmable persistency checking module 110 may include a counter that increments whenever a saturation event is detected. The counter may be reset to zero at the beginning of the persistency checking period at time t1. At the end of the persistency checking period (at time t2), the current value of this counter may be compared to the programmable value m. If the counter value is less than m, the AGS persistency checking condition has not been met (i.e., at least one Tunit exhibits an unsaturated ADC output). If the counter value is equal to m, the AGS persistency checking condition is satisfied (i.e., the ADC output has saturated during each and every Tunit between time t1 and t2). The logic AND gate shown in FIG. 5 may be an actual hardware implementation or may merely be a schematic representation of the behavior that is realized by the persistency checking module.

In response to determining that the AGS persistency condition has not been satisfied, the light sensor may continue operating in high gain mode for the remainder of the integration time (e.g., from cycle m+1, m+2, . . . N). In this scenario, the total integration time will be equal to N times the duration of Tunit.

In response to determining, that the AGS persistency condition has been met, the AGS control logic 106 may reset the photodetector, optionally performing auto-zeroing operations on A/D converter 102 (at time t2), and then send appropriate control signals to A/D converter 102 to switch converter 102 from high gain mode to a lower gain mode. In the example of FIG. 5, the reset/auto-zeroing operations may last one Tunit. In such scenario, the effective integration time will be restarted and will therefore be equal to (N-m-1) times the duration of Tunit. This is merely illustrative. In general, the reset/auto-zeroing operations may last k Tunits. In such cases, the effective integration time will be restarted and will be equal to (N-m-k) times the duration of Tunit. In this approach, the high gain mode integration time from time t1 to t3 (when the AGS persistency condition is not met) is always greater than the low gain mode integration time, which is a subset of the period from time t2-t3. The parameter N may generally be set by system level constraints.

At the end of the integration time (at time t3), the light sensor may be reset back to high gain mode (if necessary), and another integration time may be automatically initiated or the system may wait for some time before beginning another integration.

Figure 6:
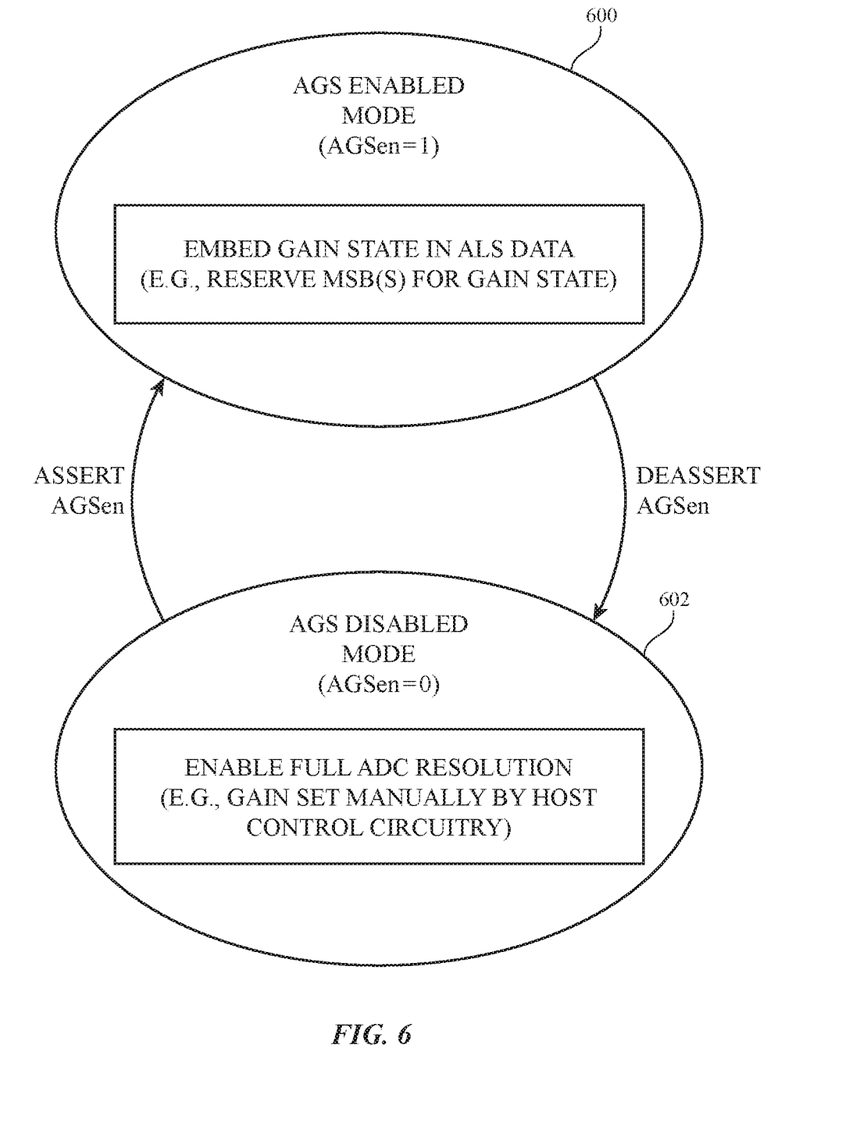
FIG. 6 is a diagram showing two different modes in which the light sensor of FIG. 4 may be operated in accordance with an embodiment.

FIG. 6 is a diagram showing how light sensor 26 of the type shown in FIG. 4 may further be operated in an AGS enabled mode and an AGS disabled mode. As described in connection with FIG. 4, AGS control logic 106 may receive an asserted enable signal AGSen that places the light sensor in the AGS enabled mode 600. When the auto gain switching capability is enabled, the light sensor (e.g., the A/D converter) may be placed in different gain modes.

In accordance with an embodiment, the current gain state of the light sensor may be embedded in one or more most significant bits (MSB) in the ambient light sensor output. As an example, an MSB of "0" may reflect a high gain mode, whereas an MSB of "1" may be indicative of a low gain mode. Since high gain mode is indicative of a lower lux level, low gain results should be numerically larger than high gain results for easier digital comparison. Embedding the gain state as part of the light sensor output can help reduce the number of serial interlace transactions with the host control circuitry, thereby minimizing the response time between the ambient light sensor reading and the display brightness control.

When enable signal AGSen is deasserted, the light sensor may be placed in an AGS disabled mode 602. When the auto gain switching capability is disabled, the light sensor (e.g., the A/D converter) may be placed in a fixed gain mode that is manually set by the host controller. The A/D converter may be manually set to low gain mode or high gain mode when the light sensor is operated in state 602. Since the host control circuitry knows the current gain setting of the ambient light sensor, no bits in the ADC output need to be reserved for the gain setting and full ADC resolution can be enabled. In other words, the ADC resolution in mode 602 may be greater than the ADC resolution in mode 600 (since mode 600 reserves one or more bits to encode the current gain state of the ambient light sensor). The light sensor may be placed back in state 600 by reasserting enable signal AGSen.

Figure 7:
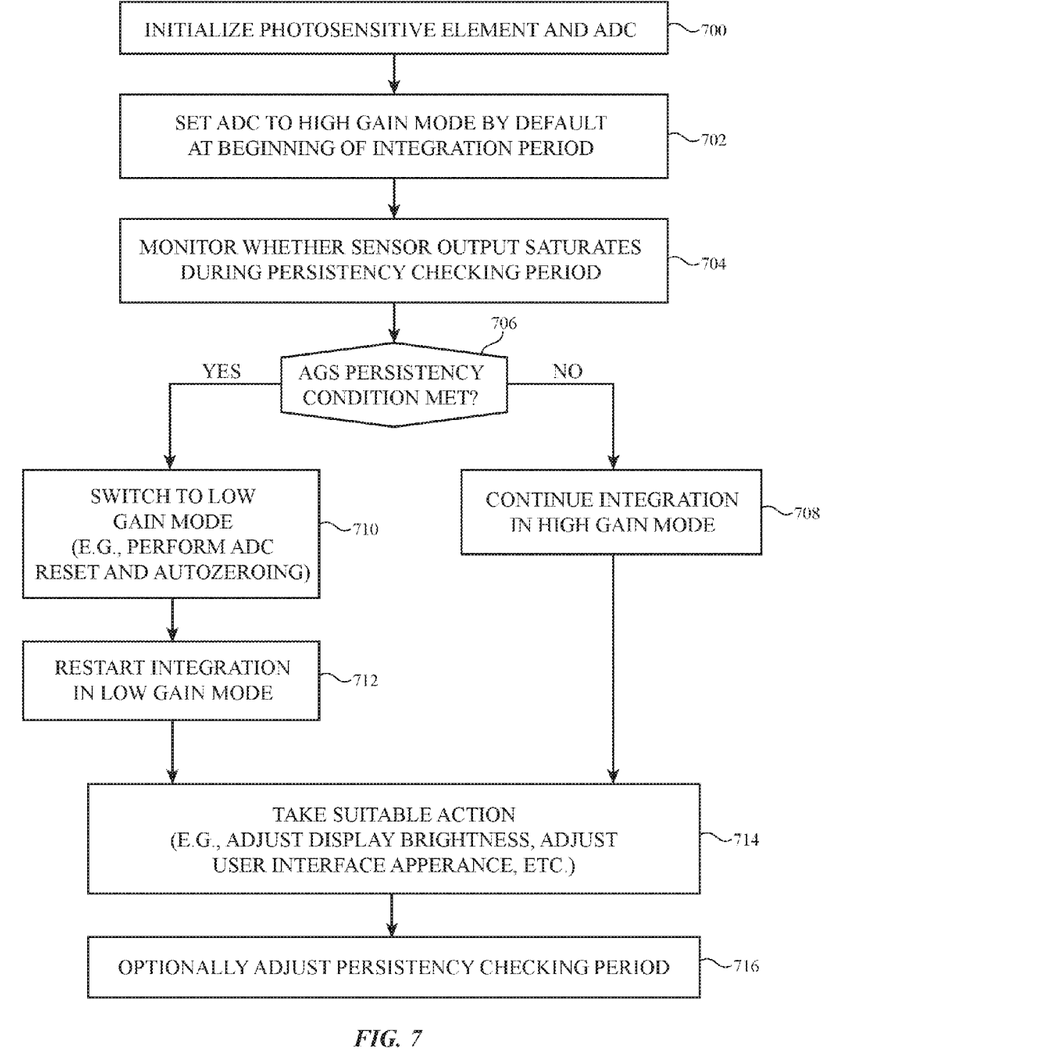
FIG. 7 is a flow chart of illustrative steps for operating a light sensor of the type shown in FIG. 4 in accordance with an embodiment.

FIG. 7 is a flow chart of illustrative steps for operating a light sensor of the type described in connection with the embodiments of FIGS. 1-6, where the light sensor is operated in the AGS enabled mode (e.g., signal AGSen has been asserted). At step 700, the photosensitive element 100 and the A/D converter 102 may be properly initialized (e.g., by performing suitable resetting and calibration operations). At step 702, the A/D converter may be set to high gain mode by default at the beginning of the integration period.

At step 704, the AGS control logic may be used to monitor whether the light sensor output saturates during the persistency checking period. In particular, the AGS control logic may include a saturation detection module for detecting when a saturation event has occurred and also a programmable persistency checking module for determining whether or not the persistency condition has been satisfied (at step 706). For example, the persistency checking module may be configured to verify whether the ADC output has saturated for a programmable number of consecutive persistency check cycles (e.g., described as interval Tunit in FIG. 5).

In response to detecting that the AGS persistency condition has not be met, the light sensor may continue integrating in the high gain mode (at step 708). In response to detecting that the AGS persistency condition has been met, the light sensor may be configured to switch to low gain mode (at step 710). During this time the photodetector and the A/D converter may be reset in preparation for the low gain mode integration. At step 712, the low gain mode integration may begin.

Processing may proceed to step 714 from either step 708 or 712. At step 714, device 10 (FIG. 1) may use control circuitry 16 to take a suitable action such as adjusting a display brightness setting for display 14, adjusting the appearance of items displayed on display 14 (e.g., icon shading and texture, shading and texture for other items on display 14, etc.), taking other actions to adjust the operation of device 10, etc. At step 716, the device may optionally adjust the duration of the persistency checking period if it determines that a stronger or weaker filtering effect might be more appropriate given the current operating conditions. For example, the persistency checking period may be lengthened to increase the filtering strength or may be shortened to decrease the filtering strength.

The foregoing is merely illustrative and various modifications can be made by those skilled in the art without departing from the scope and spirit of the described embodiments. The foregoing embodiments may be implemented individually or in any combination.

What is claimed is:

1. An electronic device that is exposed to ambient light, comprising:
    a housing;
    control circuitry in the housing; and
    an ambient light sensor in the housing with which the control circuitry measures an ambient light intensity, wherein the ambient light sensor is operable in a plurality of gain states and comprises:
        a persistency checking module that determines when an ambient light sensor output is saturated during a plurality of consecutive intervals to filter out high intensity pulses, wherein the ambient light sensor switches from a first gain state in the plurality of gain states to a second gain state in the plurality of gain states in response to determining that the ambient light sensor output is saturated during each of the plurality of consecutive intervals.

2. The electronic device defined in claim 1, wherein the control circuitry selectively enables the ambient light sensor in an auto gain switching mode that allows the ambient light sensor to operate in the plurality of gain states.

3. The electronic device defined in claim 2, wherein the control circuitry manually sets the ambient light sensor in a fixed gain state in response to disabling the auto gain switching mode of the ambient light sensor.

4. The electronic device defined in claim 3, wherein the ambient light sensor exhibits a first analog-to-digital conversion (ADC) resolution when the auto gain switching mode is enabled and a second analog-to-digital conversion resolution that is greater than the first analog-to-digital conversion resolution when the auto gain switching mode is disabled.

5. The electronic device defined in claim 1, wherein the ambient light sensor comprises:
    an auto gain switching (AGS) control logic that places the ambient light sensor in one of the plurality of gain states.

6. The electronic device defined in claim 5, wherein the auto gain switching control logic includes a saturation detection module that detects when the ambient light sensor output is saturated.

7. The electronic device defined in claim 6, wherein the auto gain switching control logic includes the persistency checking module.

8. The electronic device defined in claim 7, wherein the number of consecutive intervals that is checked by the persistency checking module is programmable.

9. A method for operating an electronic device having a housing, control circuitry in the housing, and an ambient light sensor in the housing, the method comprising:
- using the ambient light sensor to output an ambient light sensor reading to the control circuitry;
- using auto gain switching (AGS) control logic in the ambient light sensor to place the ambient light sensor in a plurality of gain states; and
- using the auto gain switching control logic to switch from one gain state to another gain state in the plurality of gain states while filtering out spurious noise sources, filtering out the spurious noise sources comprising:
  - with a persistency checking module in the auto gain switching control logic, determining whether the ambient light sensor reading is saturated during a plurality of consecutive intervals, wherein the auto gain switching control logic switches from one gain state to another gain state in the plurality of gain states in response to determining that the ambient light sensor reading is saturated during each of the plurality of consecutive intervals.

10. The method defined in claim 9, wherein the electronic device further includes a display in the housing, the method further comprising:
- using the control circuitry to adjust the brightness of the display depending on the magnitude of the ambient light sensor reading.

11. The method defined in claim 9, further comprising: setting the ambient light sensor to a high gain state at the beginning of an integration period.

12. The method defined in claim 11, wherein the plurality of consecutive intervals make up a persistency checking period that is a subset of the integration period.

13. The method defined in claim 12, further comprising: determining whether a persistency checking condition is satisfied by verifying whether the ambient light sensor reading is consistently saturated during the entirety of the persistency checking period.

14. The method defined in claim 12, further comprising: dynamically adjusting the duration of the persistency checking period.

15. The method defined in claim 13, further comprising:
- in response to determining that the persistency checking condition is not satisfied, continuing to operate the ambient light sensor in the high gain state; and
- in response to determining that the persistency checking condition is satisfied, setting the ambient light sensor to a low gain state.

16. The method defined in claim 15, further comprising: when the ambient light sensor is in the low gain state, resetting the ambient light sensor back to the high gain state at the end of the integration period.

17. The method defined in claim 9, further comprising: embedding the gain state of the ambient light sensor in the ambient light sensor reading.

18. A light sensor that detects ambient light, comprising:
- a photosensitive element;
- an analog-to-digital converter that receives charge from the photosensitive element and generates a corresponding output; and
- an auto gain switching (AGS) controller that configures the analog-to-digital converter in one of a plurality of gain modes and that implements a persistency checking mechanism that filters out bright light pulses.

19. The light sensor defined in claim 18, wherein the auto gain switching controller includes a saturation detection module that detects whether the bright light pulses result in saturation at the output of the analog-to-digital converter.

20. The light sensor defined in claim 19, wherein the auto gain switching controller includes a counter for counting how often the output of the analog-to-digital converter saturates during a persistency checking period.

21. The light sensor defined in claim 20, wherein the auto gain switching controller dynamically configures the analog-to-digital converter in another one of the plurality of gain modes in response to determining that the counter has a count that is equal to a predetermined threshold while maintaining the gain mode of the analog-to-digital converter in response to determining that the count is less than the predetermined threshold.

22. The light sensor defined in claim 20, wherein the auto gain switching controller is further configured to reset the analog-to-digital converter and to switch the analog-to-digital converter from a high gain mode in the plurality of gain modes to a low gain mode in the plurality of gain modes in response to determining that the count is equal to the predetermined threshold.

* * * * *